(12) United States Patent
Abe et al.

(10) Patent No.: US 12,319,041 B2
(45) Date of Patent: Jun. 3, 2025

(54) LAMINATING DEVICE

(71) Applicant: Panasonic Intellectual Property Management Co., Ltd., Osaka (JP)

(72) Inventors: Ryuta Abe, Osaka (JP); Tatsuya Masada, Hyogo (JP); Masahide Maruyama, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 144 days.

(21) Appl. No.: 18/247,040

(22) PCT Filed: Jul. 16, 2021

(86) PCT No.: PCT/JP2021/026755
§ 371 (c)(1),
(2) Date: Mar. 28, 2023

(87) PCT Pub. No.: WO2022/070559
PCT Pub. Date: Apr. 7, 2022

(65) Prior Publication Data
US 2023/0364898 A1 Nov. 16, 2023

(30) Foreign Application Priority Data
Sep. 30, 2020 (JP) ................. 2020-164621

(51) Int. Cl.
*B65H 5/12* (2006.01)
*B32B 37/00* (2006.01)
(Continued)

(52) U.S. Cl.
CPC ...... *B32B 37/0053* (2013.01); *B32B 38/1858* (2013.01); *B65H 5/12* (2013.01);
(Continued)

(58) Field of Classification Search
CPC .. B65H 5/12; B65H 31/10; B65H 2406/3454; B65G 47/91; B65G 29/00; B65G 29/02; B65G 29/40; B32B 38/1858
See application file for complete search history.

(56) References Cited

U.S. PATENT DOCUMENTS

| 8,845,839 B2 | 9/2014 | Yuhara et al. |
| 2014/0027067 A1 | 1/2014 | Yuhara et al. |
| 2021/0184240 A1* | 6/2021 | Yamashita ............... B65H 5/14 |

FOREIGN PATENT DOCUMENTS

| JP | 2012-221715 A | 11/2012 |
| JP | 2017137178 A | * 8/2017 |

OTHER PUBLICATIONS

English machine translation for JP2017-137178 (Year: 2017).*

(Continued)

*Primary Examiner* — Scott W Dodds
(74) *Attorney, Agent, or Firm* — Rimon P.C.

(57) ABSTRACT

A laminating device is adapted to laminate a plurality of sheet members on a lamination stage and includes: a plurality of laminating heads2 that each has a curved holding surface; a drum section in which the plurality of laminating heads are arranged, the drum section holding each laminating head, and rotation of the drum section causing each laminating head to advance to a laminating position facing a planar lamination surface; and a rolling motion mechanism that rolls the holding surface on the lamination surface so that a delivery point of the sheet member moves from a rear end to a front end of the sheet member while each laminating head is caused to move by the drum section.

5 Claims, 5 Drawing Sheets

(51) Int. Cl.
*B32B 38/18* (2006.01)
*B65H 29/24* (2006.01)
*B65G 47/91* (2006.01)
*B65H 29/10* (2006.01)
*H01M 10/04* (2006.01)

(52) U.S. Cl.
CPC ........... *B65H 29/241* (2013.01); *B65G 47/91* (2013.01); *B65H 29/10* (2013.01); *B65H 2406/3454* (2013.01); *H01M 10/04* (2013.01)

(56) References Cited

OTHER PUBLICATIONS

International Search Report issued in corresponding International Application No. PCT/JP2021/026755, dated Sep. 7, 2021, with English translation.

\* cited by examiner

LAMINATING DEVICE

CROSS-REFERENCE TO RELATED APPLICATIONS

This application is the U.S. National Phase under 35 U.S.C. § 371 of International Patent Application No. PCT/JP2021/026755, filed on Jul. 16, 2021, which in turn claims the benefit of Japanese Patent Application No. 2020-164621, filed on Sep. 30, 2020, the entire content of each of which is incorporated herein by reference.

BACKGROUND

Field of the Invention

The present disclosure relates to a laminating device.

Description of the Related Art

As in-vehicle batteries, for example, laminate-type batteries have been developed. Such a battery has a structure in which a container contains a laminated electrode assembly, in which multiple positive electrode plates and multiple negative electrode plates are alternatively laminated with a separator in between, and an electrolyte. For example, patent literature 1 discloses a device to manufacture such a laminate-type battery whereby individual pieces of electrode plates and separators are sucked by a suction pad by vacuum suction, conveyed to a lamination stage, and layered on the stage.

Patent Literature 1: JP2012-221715

In laminate-type batteries, it is desirable to reduce misalignment of electrode plates as much as possible from the perspective of increasing the battery performance (e.g., higher capacity, higher energy density). In particular, it is required that the positive electrode plate does not protrude from the opposite negative electrode plate in a lithium-ion secondary battery.

In the related-art laminating device, it sometimes happen that the suction pad or the lamination stage is vibrated due to the inertia when the suction pad is stopped on the lamination stage. If a laminating action is performed under the vibration, a position gap may be created between the electrode plate, etc. sought to be laminated and the electrode plate, etc. on the stage. It was therefore necessary to postpone the laminating action until the vibration subsides. However, providing a standby time could inhibit increase in the throughput of the laminating device. Further, the above-described issue is also of a concern when sheet members other than electrode plates and separators are laminated.

SUMMARY OF THE INVENTION

The present disclosure addresses the issue described above, and a purpose thereof is to provide a technology of increasing the throughput of a laminating device.

An aspect of the present disclosure relates to a laminating device adapted to laminate a plurality of sheet members on a lamination stage. The device includes: a plurality of laminating heads that each has a curved holding surface for holding the sheet member; a drum section in which the plurality of laminating heads are arranged in a circumferential direction, the drum section holding each laminating head such that the holding surface is swingable, and rotation of the drum section causing each laminating head to advance to a laminating position facing a planar lamination surface provided in the lamination stage; and a rolling motion mechanism that rolls the holding surface on the lamination surface so that a delivery point of the sheet member formed between the holding surface and the lamination surface moves from a rear end to a front end of the sheet member in a rotational direction of the drum section while each laminating head is caused to move by the rotation of the drum section.

Optional combinations of the aforementioned constituting elements, and implementations of the present disclosure in the form of methods, devices, systems, etc. may also be practiced as additional modes of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Hereinafter, the present disclosure will be described based on preferred embodiments with reference to the accompanying drawings. The embodiments are not intended to limit the scope of the present disclosure but exemplify the present disclosure. Not all of the features and the combinations thereof described in the embodiments are necessarily essential to the present disclosure. Identical or like constituting elements, members, processes shown in the drawings are represented by identical symbols and a duplicate description will be omitted as appropriate.

The scales and shapes shown in the figures are defined for convenience's sake to make the explanation easy and shall not be interpreted limitatively unless otherwise specified. Terms like "first", "second", etc. used in the specification and claims do not indicate an order or importance by any means unless specified otherwise and are used to distinguish a certain feature from the others. Those of the members that are not important in describing the embodiment are omitted from the drawings.

Figure 1:
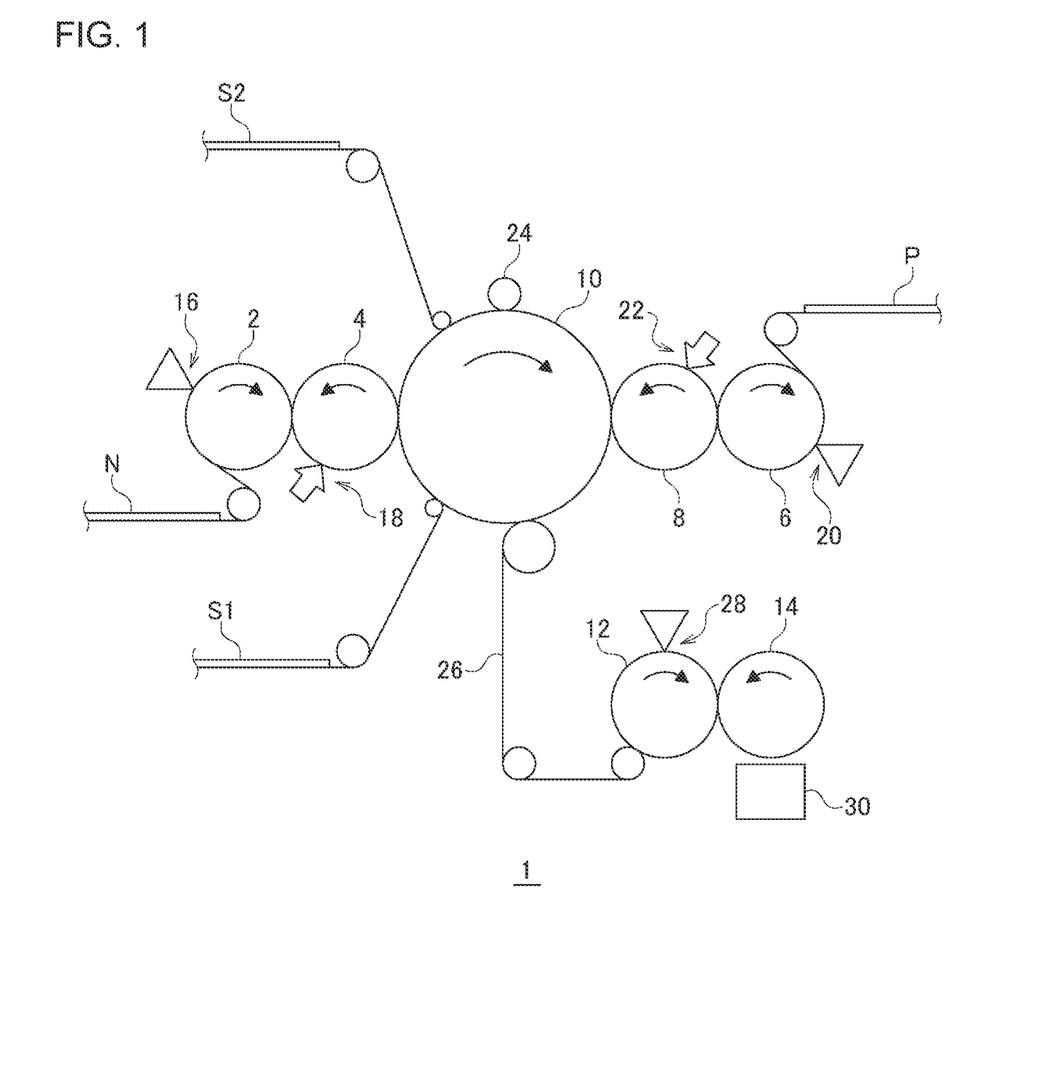
FIG. 1 is a schematic view of a laminated electrode assembly manufacturing device.

FIG. 1 is a schematic view of a laminated electrode assembly manufacturing device 1. By way of one example, the laminated electrode assembly manufacturing device 1 is a continuous drum-type manufacturing device in which multiple drums are combined. Performing each process of cutting, heating, bonding, laminating, and the like of electrode bodies and separators on the drums enables high-speed and continuous manufacturing of laminated electrode assemblies. The laminated electrode assemblies may be used, for example, for lithium-ion secondary batteries.

The laminated electrode assembly manufacturing device 1 includes a first electrode cutting drum 2, a first electrode heating drum 4, a second electrode cutting drum 6, a second electrode heating drum 8, a bonding drum 10, a separator cutting drum 12, and a laminating drum 14.

The first electrode cutting drum 2 cuts a continuous sheet (continuous body) of multiple first electrode plates into multiple individual first electrode plates and conveys the plates. In the present embodiment, the first electrode is a negative electrode. To the first electrode cutting drum 2, a strip-shaped first electrode continuous sheet N as the continuous sheet of multiple first electrode plates is supplied. The first electrode continuous sheet N includes a first electrode current collector and a first electrode active material layer. The first electrode active material layer is laminated on the first electrode current collector. In the present embodiment, the first electrode active material layer is laminated on both sides of the first electrode current collector, but the first electrode active material layer may be laminated on only one side of the first electrode current collector.

Each of the first electrode current collector and the first electrode active material layer can be made of a publicly-known material and has a publicly-known structure. The first electrode current collector may be, for example, constituted by foil or a porous body made of copper, aluminum, or the like. The first electrode active material layer may be formed by applying, onto a surface of the first electrode current collector, first electrode mixture slurry containing a first electrode active material, a binder, a dispersant, and the like and by drying and rolling the applied film. The thickness of the first electrode current collector may be in the range from 3 μm to 50 μm inclusive, for example. Also, the thickness of the first electrode active material layer may be in the range from 10 μm to 100 μm inclusive, for example.

The first electrode cutting drum 2 includes multiple holding heads arranged in a circumferential direction of the drum, and a cutting blade that cuts the first electrode continuous sheet N. Each of the multiple holding heads includes a holding surface that sucks and holds the first electrode continuous sheet N. The holding surface of each holding head faces outward from the first electrode cutting drum 2. The first electrode continuous sheet N supplied to the first electrode cutting drum 2 is conveyed by the rotation of the first electrode cutting drum 2 while being sucked and held by the holding surfaces of the multiple holding heads.

Each of the multiple holding heads rotates around the central axis of the first electrode cutting drum 2 and can also move in a circumferential direction of the drum independently of other holding heads. Relative movement of each holding head is achieved by mounting thereon a motor that is different from the motor used to rotate the first electrode cutting drum 2. The independent driving of the holding heads enables adjustment of the positions of cutting by the cutting blade in the first electrode continuous sheet N and also enables adjustment of the positions of the individually divided first electrode plates, for example.

The first electrode cutting drum 2 sucks and holds the first electrode continuous sheet N supplied and rotates to convey the first electrode continuous sheet N. At a cutting position 16 schematically illustrated in FIG. 1, the first electrode cutting drum 2 cuts the first electrode continuous sheet N. The first electrode continuous sheet N is cut by the cutting blade at a position between adjacent holding heads, so that multiple individual first electrode plates are obtained. Each first electrode plate thus obtained is conveyed while being sucked and held by each holding head. The positions of the multiple produced first electrode plates are monitored by a camera or the like.

The first electrode heating drum 4 is located at close proximity to the first electrode cutting drum 2. Before the proximity position between the first electrode cutting drum 2 and the first electrode heating drum 4, the speed of a holding head of the first electrode cutting drum 2 is temporarily increased or decreased until it becomes substantially identical with the linear velocity of the first electrode heating drum 4. As a result, the relative speed of the holding head with respect to the first electrode heating drum 4 becomes substantially zero. At the time when the relative speed becomes substantially zero, the holding head transfers, to the first electrode heating drum 4 side, the first electrode plate that the holding head has sucked and held.

The first electrode heating drum 4 rotates while sucking and holding the first electrode plates transferred from the first electrode cutting drum 2 and preheats the first electrode plates with a built-in heater. The preheating is performed to thermally bond a first electrode plate and a separator in the subsequent bonding process. Although the first electrode plates are heated at a heating position 18 in the present embodiment, the position is not limited thereto. For example, the first electrode plates may be heated in the entire circumferential area of the first electrode heating drum 4.

The second electrode cutting drum 6 is a drum for cutting a continuous sheet of multiple second electrode plates into multiple individual second electrode plates and conveying the plates. In the present embodiment, the second electrode is a positive electrode. To the second electrode cutting drum 6, a strip-shaped second electrode continuous sheet P, which is the continuous sheet of multiple second electrode plates, is supplied. The second electrode continuous sheet P includes a second electrode current collector and a second electrode active material layer. The second electrode active material layer is laminated on the second electrode current collector. In the present embodiment, the second electrode active material layer is laminated on both sides of the second electrode current collector, but the second electrode active material layer may be laminated on only one side of the second electrode current collector.

Each of the second electrode current collector and the second electrode active material layer can be made of a publicly-known material and has a publicly-known structure. The second electrode current collector is constituted by, for example, foil or a porous body made of stainless steel, aluminum, or the like. The second electrode active material layer is formed by applying, onto a surface of the second electrode current collector, second electrode mixture slurry containing a second electrode active material, a binder, a dispersant, and the like and by drying and rolling the applied film. The thickness of the second electrode current collector is in the range from 3 μm to 50 μm inclusive, for example. Also, the thickness of the second electrode active material layer may be in the range from 10 μm to 100 μm inclusive, for example.

The second electrode cutting drum 6 has multiple holding heads arranged in a circumferential direction of the drum and a cutting blade that cuts the second electrode continuous sheet P. Each of the multiple holding heads has a holding surface that sucks and holds the second electrode continuous sheet P. The holding surface of each holding head faces outward from the second electrode cutting drum 6. The second electrode continuous sheet P supplied to the second electrode cutting drum 6 is conveyed by the rotation of the second electrode cutting drum 6 while being sucked and held by the holding surfaces of the multiple holding heads.

Each of the multiple holding heads rotates around the central axis of the second electrode cutting drum 6 and can also move in a circumferential direction of the drum independently of other holding heads. Relative movement of each holding head is achieved by mounting thereon a motor that is different from the motor used to rotate the second electrode cutting drum 6. The independent driving of the holding heads enables adjustment of the positions of cutting by the cutting blade in the second electrode continuous sheet P and also enables adjustment of the positions of the individually divided second electrode plates.

The second electrode cutting drum 6 sucks and holds the supplied second electrode continuous sheet P and rotates to convey the second electrode continuous sheet P. At a cutting position 20 schematically illustrated in FIG. 1, the second electrode cutting drum 6 cuts the second electrode continuous sheet P. The second electrode continuous sheet P is cut by the cutting blade at a position between adjacent holding heads, so that multiple individual second electrode plates are obtained. Each second electrode plate thus obtained is conveyed while being sucked and held by each holding head. The positions of the multiple produced second electrode plates are monitored by a camera or the like.

The second electrode heating drum 8 is located at close proximity to the second electrode cutting drum 6. Before the proximity position between the second electrode cutting drum 6 and the second electrode heating drum 8, the speed of a holding head of the second electrode cutting drum 6 is temporarily increased or decreased until it becomes substantially identical with the linear velocity of the second electrode heating drum 8. As a result, the relative speed of the holding head with respect to the second electrode heating drum 8 becomes substantially zero. At the time when the relative speed becomes substantially zero, the holding head transfers, to the second electrode heating drum 8 side, the second electrode plate that the holding head has sucked and held.

The second electrode heating drum 8 rotates while sucking and holding the second electrode plates transferred from the second electrode cutting drum 6 and preheats the second electrode plates with a built-in heater. The preheating is performed to thermally bond a second electrode plate and a separator in the subsequent bonding process. Although the second electrode plates are heated at a heating position 22 in the present embodiment, the position is not limited thereto. For example, the second electrode plates may be heated in the entire circumferential area of the second electrode heating drum 8.

The bonding drum 10 is a drum that forms a continuous laminated sheet 26 (continuous laminated body) in which multiple laminated sheets (unit laminated bodies) are continuous. Each laminated sheet is constituted by a first separator, a first electrode plate, a second separator, and a second electrode plate. To the bonding drum 10, a strip-shaped first separator continuous sheet S1, in which multiple first separators are continuously arranged, and a strip-shaped second separator continuous sheet S2, in which multiple second separators are continuously arranged, are supplied. On a surface of each of the first separator continuous sheet S1 and the second separator continuous sheet S2, a thermal bonding layer is provided. The thermal bonding layer has a property of developing no adhesiveness at room temperature but developing adhesiveness when heated. The thermal bonding layer may be, for example, a thermoplastic layer containing a thermoplastic polymer, which develops adhesiveness based on plastic deformation of the thermoplastic polymer caused by heating.

Further, the bonding drum 10 is located at close proximity to the first electrode heating drum 4 and the second electrode heating drum 8. Then, to the bonding drum 10, multiple first electrode plates are supplied from the first electrode cutting drum 2 via the first electrode heating drum 4, and multiple second electrode plates are supplied from the second electrode cutting drum 6 via the second electrode heating drum 8. A first electrode plate is rotationally conveyed while being preheated on the first electrode heating drum 4 and is transferred, to the bonding drum 10 side, at the proximity position between the first electrode heating drum 4 and the bonding drum 10. A second electrode plate is rotationally conveyed while being preheated on the second electrode heating drum 8 and is transferred, to the bonding drum 10 side, at the proximity position between the second electrode heating drum 8 and the bonding drum 10.

The first separator continuous sheet S1, each first electrode plate, the second separator continuous sheet S2, and each second electrode plate are supplied to the bonding drum 10 at positions provided in the enumerated order from the upstream side of the rotational direction of the bonding drum 10. Accordingly, the first separator continuous sheet S1 is supplied to the bonding drum 10 first at a certain position. The first separator continuous sheet S1 is sucked and held by the bonding drum 10 and rotationally conveyed. Subsequently, at a position on the downstream side of the supply position of the first separator continuous sheet S1, the first electrode plates are supplied from the first electrode heating drum 4 to the bonding drum 10 and placed on the first separator continuous sheet S1. The multiple first electrode plates are arranged on the first separator continuous sheet S1 at predetermined intervals in the conveying direction of the first separator continuous sheet S1.

Subsequently, at a position on the downstream side of the supply position of the first electrode plates, the second separator continuous sheet S2 is supplied to the bonding drum 10 and placed over the multiple first electrode plates. Thereafter, the first separator continuous sheet S1, multiple first electrode plates, and second separator continuous sheet S2 are pressurized by a thermocompression bonding roller 24, at a position on the downstream side of the supply position of the second separator continuous sheet S2. Accordingly, the first separator continuous sheet S1, each first electrode plate, and the second separator continuous sheet S2 are bonded together. Subsequently, at a position on the downstream side of the position of pressure bonding by the thermocompression bonding roller 24, the second electrode plates are supplied from the second electrode heating drum 8 to the bonding drum 10 and placed on the second separator continuous sheet S2. The multiple second electrode plates are arranged on the second separator continuous sheet S2 at predetermined intervals in the conveying direction of the second separator continuous sheet S2. Also, the multiple second electrode plates are bonded to the second separator continuous sheet S2 by the pressing force of the second electrode heating drum 8.

Through the process described above, the first separator continuous sheet S1, multiple first electrode plates, second separator continuous sheet S2, and multiple second electrode plates are laminated in this order and bonded to each other, forming a continuous laminated sheet 26. The continuous laminated sheet 26 has a structure in which the laminated sheets, which each are constituted by a first separator, a first electrode plate, a second separator, and a second electrode plate, are continuously connected by the first separator continuous sheet S1 and the second separator continuous sheet S2. The continuous laminated sheet 26 is conveyed from the bonding drum 10 to the separator cutting drum 12. By halting the supply of the second electrode plates from the second electrode cutting drum 6 side, three-layered laminated sheets without the second electrode plates may be produced after every fixed number of pieces. The electrode plates of which supply is halted may also be the first electrode plates.

The separator cutting drum 12 is a drum that cuts the first separator continuous sheet S1 and the second separator continuous sheet S2 in the continuous laminated sheet 26 to obtain multiple individual laminated sheets. The separator cutting drum 12 has multiple holding heads arranged in a circumferential direction of the drum and a cutting blade that cuts the continuous laminated sheet 26. Each of the multiple holding heads has a holding surface that sucks and holds the continuous laminated sheet 26. The holding surface of each holding head faces outward from the separator cutting drum 12. The continuous laminated sheet 26 supplied to the separator cutting drum 12 is conveyed by the rotation of the separator cutting drum 12 while being sucked and held by the holding surfaces of the multiple holding heads.

Each of the multiple holding heads rotates around the central axis of the separator cutting drum 12 and can also move in a circumferential direction of the drum independently of other holding heads. Relative movement of each holding head is achieved by mounting thereon a motor that is different from the motor used to rotate the first electrode cutting drum 2. The independent driving of the holding heads enables adjustment of the positions of cutting by the cutting blade in the continuous laminated sheet 26 and also enables adjustment of the positions of the individually divided laminated sheets, for example.

At a cutting position 28 schematically illustrated in FIG. 1, the separator cutting drum 12 cuts the continuous laminated sheet 26. The continuous laminated sheet 26 is cut at a position between adjacent holding heads, so that multiple individual laminated sheets are obtained. At the time, in the continuous laminated sheet 26, the first separator continuous sheet S1 and the second separator continuous sheet S2 are cut at a position between electrode plates that are adjacent in the conveying direction of the continuous laminated sheet 26. Each laminated sheet thus obtained is conveyed while being sucked and held by each holding head. A holding head transfers, to the laminating drum 14 side, a laminated sheet that the holding head has sucked and held. The positions of the multiple produced laminated sheets are monitored by a camera or the like.

The laminating drum 14 is a drum that laminates multiple laminated sheets on a lamination stage 30 to form a laminated electrode assembly. The laminating drum 14 includes multiple laminating heads arranged in a circumferential direction of the drum. Each laminating head includes a holding surface that sucks and holds a laminated sheet. The holding surface of each laminating head faces outward from the laminating drum 14. Each of the multiple laminating heads rotates around the central axis of the laminating drum 14 and advances sequentially to a laminating position facing the lamination stage 30. The laminating head reaching the laminating position transferres, onto the lamination stage 30, a laminated sheet that the laminating head has been holding.

The lamination stage 30 is located immediately beneath the laminating drum 14. On the lamination stage 30, the laminated sheets transferred from each laminating head of the laminating drum 14 are sequentially laminated. Thus, a laminated electrode assembly is formed. The lamination stage 30 can be driven in an X-axis direction and a Y-axis direction perpendicular to each other. Also, a tilt angle on an X-Y plane of the lamination stage 30 can be adjusted. This enables adjustment of the positions in the X-axis direction and the Y-axis direction and the tilt angle of a laminated sheet transferred from the laminating drum 14, with respect to a laminated sheet already laminated on the lamination stage 30.

Figure 2:
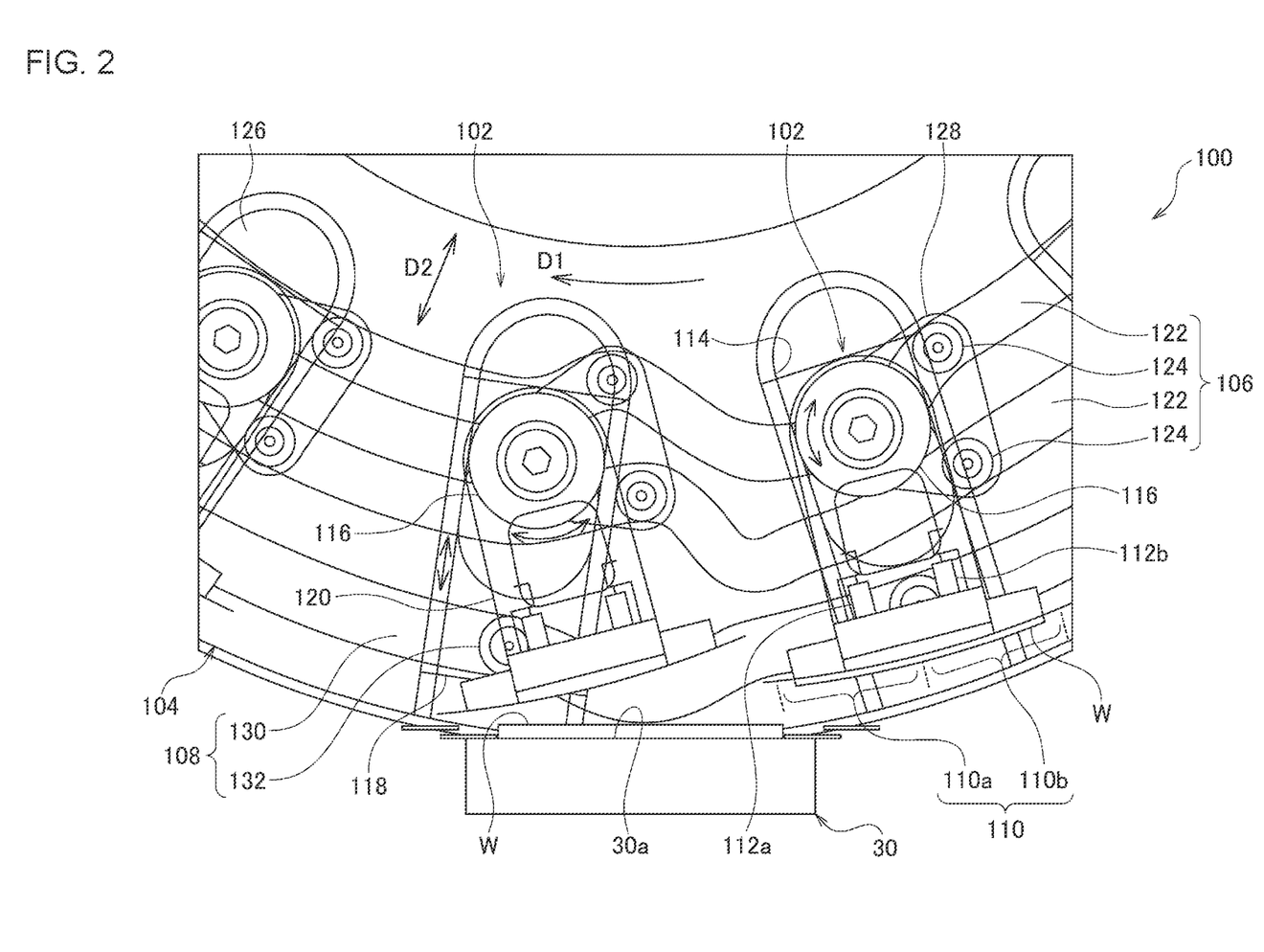
FIG. 2 is a front view showing a part of the laminating device according to the embodiment on an enlarged scale.

The laminating drum 14 is composed of a laminating device 100 according to the present embodiment. FIG. 2 is a front view showing a part of the laminating device 100 according to the embodiment on an enlarged scale. FIG. 2 shows that a drum section 104 is provided toward the front and a fixed plate 126 is provided away from the back. FIG. 2 shows a transparent view of a laminating head 102 and the drum section 104.

The laminating device 100 is a device that laminates a plurality of sheet members W on the lamination stage 30. By way of one example, the sheet member W includes at least one of an electrode plate or a separator of a battery. The sheet member W of the present embodiment is a laminated sheet in which an electrode plate and a separator are laminated. The laminating device 100 includes multiple laminating heads 102, the drum section 104, a rolling motion mechanism 106, and a displacement mechanism 108.

Each of the laminating heads 102 has a holding surface 110 for holding the sheet member W. The holding surface 110 has a curved shape. Each holding surface 110 is curved along the circumferential direction of the drum section 104. The holding surface 110 of the present embodiment sucks and holds the sheet member W by sucking an atmosphere gas such as air. The holding surface 110 includes multiple suction holes (not shown) arranged in the circumferential direction of the drum section 104.

Further, the holding surface 110 includes at least a first suction part 110a and a second suction part 110b. The holding surface 110 of the present embodiment is organized into two regions including the first suction part 110a and the second suction part 110b. The first suction part 110a is provided more toward the front than the second suction part 110b in the rotational direction D1 of the drum section 104. The multiple suction holes are respectively allocated to the first suction part 110a and the second suction part 110b. A first suction nozzle 112a is connected to each suction hole of the first suction part 110a. A second suction nozzle 112b is connected to each suction hole of the second suction part 110b.

Each suction nozzle is connected to a vacuum pump (not shown) via a vacuum pipe (not shown). When the vacuum pump connected to the first suction nozzle 112a is driven, the atmosphere gas is sucked from the suction hole of the first suction part 110a via the vacuum pipe and the first suction nozzle 112a. This causes the sheet member W to be sucked by the first suction part 110a. Similarly, when the vacuum pump connected to the second suction nozzle 112b is driven, the atmosphere gas is sucked from the suction hole of the second suction part 110b via the vacuum pipe and the second suction nozzle 112b. This causes the sheet member W to be sucked by the second suction part 110b. The first suction part 110a and the second suction part 110b can switchably generate a suction force and cancel a suction force in a mutually independent manner.

It should be noted that it is sufficient that the first suction part 110a and the second suction part 110b can switchably generate a suction force and cancel a suction force in a mutually independent manner. Therefore, the vacuum pipe connected to the first suction part 110a and the vacuum pipe connected to the second suction part 110b are not necessarily independent. For example, the mechanism for holding the sheet member W may be comprised of a vacuum pipe connected to both the first suction part 110a and the second suction part 110b, a vacuum pump connected to the vacuum pipe, and a valve provided in the vacuum pipe. The valve can switchably establish and interrupt communication between the vacuum pump and the first suction part 110*a* and switchably establish and interrupt communication between the vacuum pump and the second suction part 110*b* in a mutually independent manner. According to this configuration, the first suction part 110*a* and the second suction part 110*b* can switchably generate a suction force and cancel a suction force in a mutually independent manner in accordance with the valve operation.

The multiple laminating heads 102 are held by the drum section 104. The drum section 104 is a cylindrical drum (see also FIG. 1), and the multiple laminating heads 102 are arranged in the circumferential direction at predetermined intervals. The holding surface 110 of the laminating heads 102 arranged in the drum section 104 faces outward in the radial direction D2 of the drum section 104. Further, the drum section 104 includes multiple elongated holes 114 extending in the radial direction D2. The multiple elongated holes 114 are arranged in the circumferential direction of the drum section 104 at predetermined intervals.

Each laminating head 102 includes a rocking shaft 116, a base plate 118, and a rocking part 120. The rocking shaft 116 is inserted into the elongated hole 114. The elongated hole 114 permits displacement of the rocking shaft 116 in the radial direction D2. Further, the rocking shaft 116 is rotatable around its own axis in the elongated hole 114. In other words, the rocking shaft 116 is capable of spinning.

The base plate 118 has a shape elongated in the radial direction D2 and is slidably supported by the drum section 104 in the radial direction D2. Further, the rocking shaft 116 is coupled to the inward end of the base plate 118 in the radial direction D2. The base plate 118 can slide the rocking shaft 116 in the radial direction D2 by sliding in the radial direction D2 in itself. The rocking shaft 116 is rotatably coupled to the base plate 118.

The rocking part 120 has a shape elongated in the radial direction D2 and has the inward end thereof in the radial direction D2 fixed to the rocking shaft 116. In other words, the rocking part 120 is coupled to the rocking shaft 116 so as not to be rotatable. The holding surface 110 is fixed to the outward end of the rocking part 120 in the radial direction D2. When the rocking shaft 116 is rotated around its own axis, therefore, the rocking part 120 and the holding surface 110 are rotated along with the rocking shaft 116. This displaces the rocking part 120 and the holding surface 110 relative to the base plate 118 and, ultimately, the drum section 104. With the above-described configuration, each laminating head 102 is held by the drum section 104 such that the holding surface 110 is swingable.

A driving mechanism (not shown) such as a motor is coupled to the center of the drum section 104. Accordingly, the drum section 104 is rotated in the rotational direction D1 to turn the multiple laminating heads 102. The rotation of the drum section 104 causes each laminating head 102 to advance to a laminating position facing the planar lamination surface 30*a* provided in the lamination stage 30.

The rolling motion mechanism 106 is a mechanism for rolling the holding surface 110 on the lamination surface 30*a*. Since the holding surface 110 has a curved shape and the lamination surface 30*a* has a planar shape, the holding surface 110 and the lamination surface 30*a* facing each other are formed such that the respective portions that approach closest to each other are formed in the respective surfaces in a localized manner. A delivery point 134 (see FIG. 4A, etc.) of the sheet member W is formed at the position of closest approach. The delivery point 134 is a position at which the sheet member W on the holding surface 110 comes into contact with the lamination surface 30*a*. Strictly speaking, the delivery point 134 is a straight line parallel to the axial direction of the drum section 104. The interval between the holding surface 110 and the lamination surface 30*a* at the delivery point 134 is substantially equal to the thickness of the sheet member W.

The rolling motion mechanism 106 rolls the holding surface 110 so that the delivery point 134 moves from the rear end to the front end of the sheet member W in the rotational direction D1 of the drum section 104 while each laminating head 102 is caused to move by the rotation of the drum section 104. The rolling motion mechanism 106 of the present embodiment realizes the rolling motion of the holding surface 110 by means of a cam mechanism. More specifically, the rolling motion mechanism 106 includes a first cam 122 and a first cam follower 124 and rolls the holding surface 110 by means of the first cam 122 and the first cam follower 124.

The first cam 122 is provided in the circular fixed plate 126 that does not follow the rotation of the drum section 104. The fixed plate 126 is arranged such that the center thereof is aligned with the rotational center of the drum section 104. The first cam 122 extends in the circumferential direction of the drum section 104 and the fixed plate 126. By way of one example, the first cam 122 is a groove cam provided on the principal surface of the fixed plate 126.

The first cam follower 124 is provided on the side of each laminating head 102 and slidably comes into contact with the first cam 122. Therefore, the first cam follower 124 moves along the first cam 122 in association with the movement of each laminating head 102 based on the rotation of the drum section 104. The first cam follower 124 is fixed to the rocking shaft 116 via a link member 128.

The rolling motion mechanism 106 of the present embodiment includes two first cams 122 and two first cam followers 124. One of the first cams 122 is more inward in the radial direction D2 than the other first cam 122 and extends in the circumferential direction of the fixed plate 126. Therefore, the two first cam followers 124 are substantially arranged in the radial direction D2. Also, the two first cam followers 124 are arranged to be displaced relative to the rocking shaft 116 in the rotational direction D1. The link member 128 by way of one example is substantially triangular, and the rocking shaft 116 and the two first cam followers 124 are fixed to the respective corners of the triangle. The rocking shaft 116 and the two first cam followers 124 are coupled to the link member 128 so as not to be rotatable with respect to the link member 128.

The two first cams 122 have a shape based on a circle concentric with the drum section 104. However, the portion of the first cam 122 extending in a region including the laminating position is displaced from the base circle to permit the rolling motion of the holding surface 110. In the present embodiment, the relative positions of the two first cam followers 124 change and the orientation of the link member 128 changes accordingly as at least one of the two first cams 122 is displaced from the baes circle. Consequently, the rocking shaft 116 is rotated, and the holding surface 110 is swung around the rocking shaft 116 to roll on the lamination surface 30*a*.

The orientation of the holding surface 110 taken when the first cam 122 is on the base circle of the first cam 122 is defined as a reference orientation. The laminating head 102 not engaged in a laminating action moves in the circumferential direction of the drum section 104 while the holding surface 110 is in the reference orientation. When the holding surface 110 is in the reference orientation, the circumferential positions of the inward first cam follower 124 and the outward first cam follower 124 are substantially aligned. In other words, the straight line extending from the center of the drum section 104 to the center of the inward first cam follower 124 and the straight line extending from the center of the drum section 104 to the center of the outward first cam follower 124 are substantially aligned.

The displacement mechanism 108 is a mechanism for displacing the entirety of the holding surface 110 in the radial direction D2 of the drum section 104. The displacement mechanism 108 of the present embodiment realizes displacement of the holding surface 110 by means of a cam mechanism. More specifically, the displacement mechanism 108 includes a second cam 130 and a second cam follower 132 and displaces the holding surface 110 by means of the second cam 130 and the second cam follower 132. The second cam 130 is provided in the fixed plate 126 that does not follow the rotation of the drum section 104. The second cam 130 extends in the circumferential direction of the drum section 104 and the fixed plate 126. By way of one example, the second cam 130 is a groove cam provided on the principal surface of the fixed plate 126. Further, the second cam 130 of the present embodiment is provided more outward than the two first cams 122 in the radial direction D2.

The second cam follower 132 is provided on the side of each laminating head 102 and slidably comes into contact with the second cam 130. Therefore, the second cam follower 132 moves along the second cam 130 in association with the movement of each laminating head 102 based on the rotation of the drum section 104. The second cam follower 132 is fixed to the outward end of the base plate 118 in the radial direction D2.

The second cams 130 has a shape based on a circle concentric with the drum section 104. However, the portion of the second cam 130 extending in a region including the laminating position is displaced from the base circle to displace the holding surface 110 in the radial direction D2. The second cam 130 of the present embodiment is curved at the laminating position in a direction away from the center of the base circle. Therefore, the second cam follower 132 passing through this portion is displaced outward in the radial direction D2 of the drum section 104. Consequently, the base plate 118 slides outward in the radial direction D2, and the entirety of the holding surface 110 approaches the lamination surface 30a.

FIG. 3A, FIG. 3B, FIG. 4A, FIG. 4B, FIG. 5A and FIG. 5B are schematic diagrams for explaining the operation of the laminating device 100. In the figures, illustration of the sheet member W is omitted. A description will be given below of the lamination operation for laminating the sheet member W performed by the laminating device 100, highlighting a particular laminating head 102a.

Figure 3A:
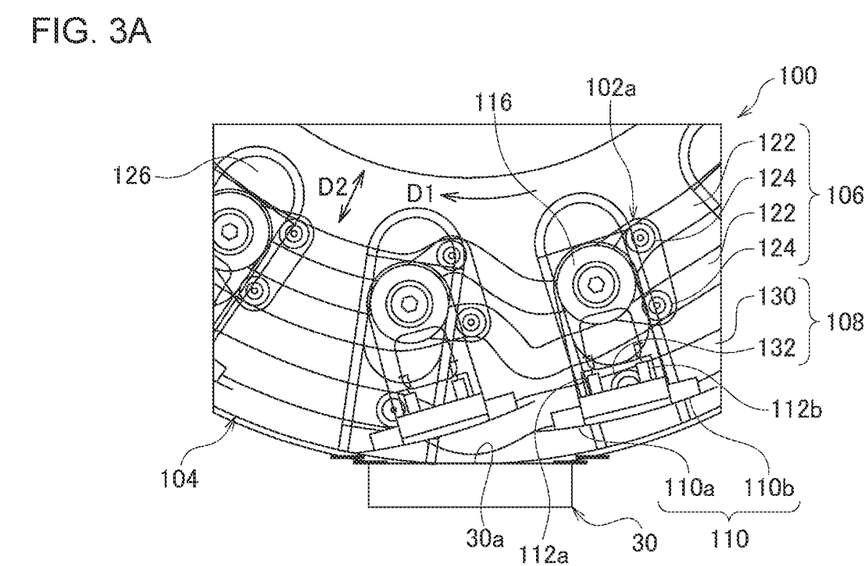
FIG. 3A and FIG. 3B are schematic diagrams for explaining the operation of the laminating device.
Figure 3B:
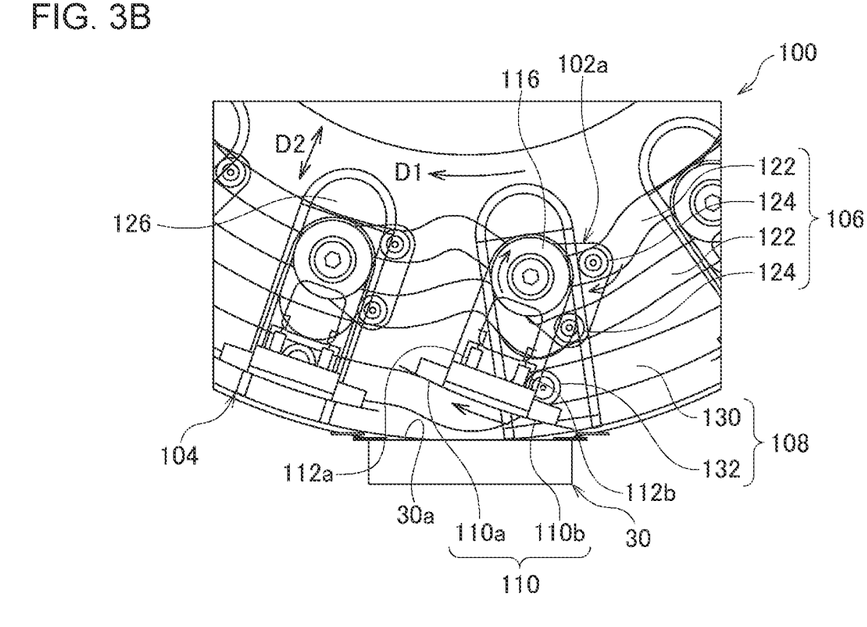

As shown in FIG. 3A, the laminating head 102a arrives at the laminating position at which the lamination surface 30a extends while the holding surface 110 is in the reference orientation. The laminating head 102a then begins to perform the laminating operation for laminating the sheet member W. As shown in FIG. 3B, the laminating operation for laminating the sheet member W is performed such that the rolling motion mechanism 106 first swings the holding surface 110 in the reference orientation forward in the rotational direction D1, causing the rear end of the holding surface 110 to approach the lamination surface 30a.

Displacement of the holding surface 110 can be realized by the first cam 122 and the first cam follower 124. More specifically, the rocking shaft 116 is rotated around its own axis in the rotational direction D1 in association with the displacement of the track of the first cam 122 in the radial direction D2. The rocking part 120 is fixed to the rocking shaft 116 and is coupled to the base plate 118 so as to be rotatable around the rocking shaft 116. Therefore, the rocking part 120 is rotated along with the rocking shaft 116 and changes its orientation with respect to the base plate 118. This swings the holding surface 110 forward (i.e., the holding surface 110 accelerates in the rotational direction D1).

The laminating device 100 of the present embodiment includes two sets of a combination of the first cam 122 and the first cam follower 124. By rotating the rocking part 120 by means of two sets of the first cam 122 and the first cam follower 124 in this way, the pressure angle between the first cam 122 and the first cam follower 124 is configured to be small. By configuring the pressure angle to be small, the load applied to the first cam 122 and the first cam follower 124 is reduced. The number of combinations of the first cam 122 and the first cam follower 124 is not limited to two. One combination or three or more combinations may be used.

Figure 4A:
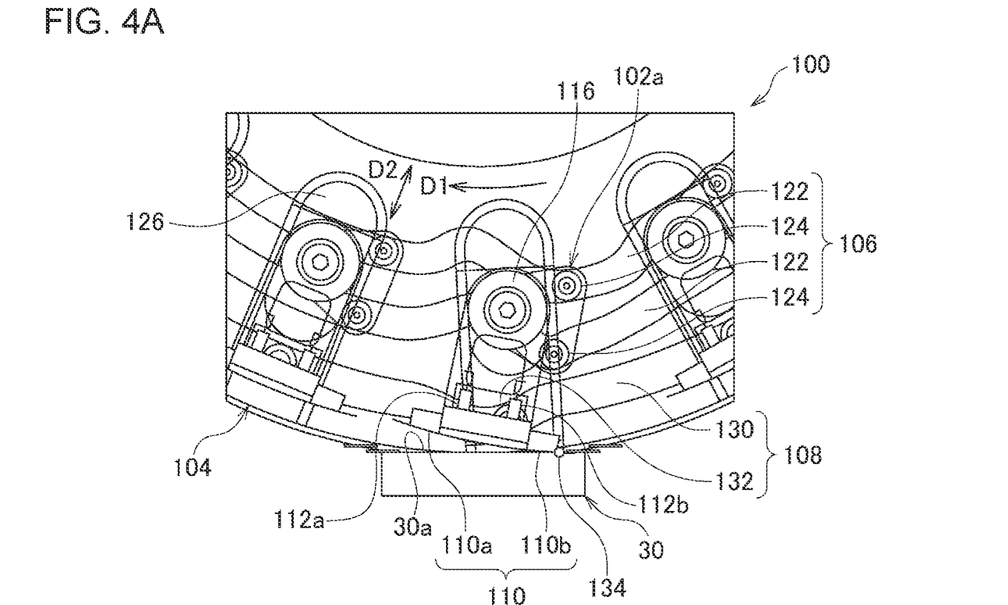
FIG. 4A and FIG. 4B are schematic diagrams for explaining the operation of the laminating device.

When the laminating head 102a advances in this state, the rear end of the sheet member W comes into contact with the lamination surface 30a, and the delivery point 134 of the sheet member W is formed between the holding surface 110 and the lamination surface 30a, as shown in FIG. 4A. When the delivery point 134 is formed, the vacuum pump connected to the second suction nozzle 112b stops being driven, and the second suction part 110b cancels the suction force. This initiates the delivery of the portion of the sheet member W held by the second suction part 110b to the lamination surface 30a.

Figure 4B:
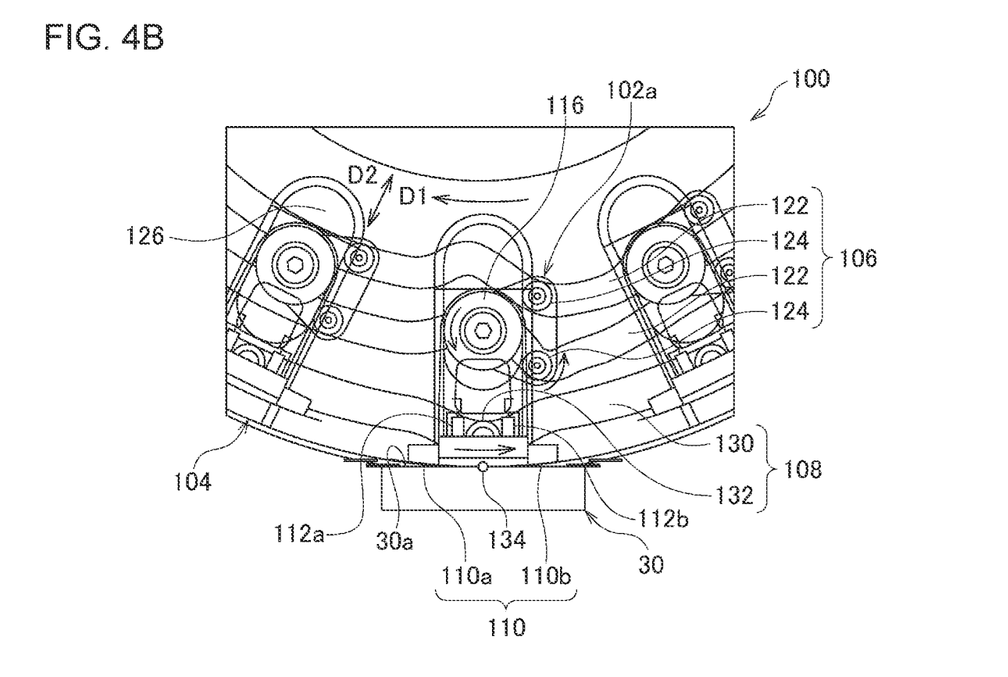

As shown in FIG. 4B, the laminating head 102a then advances further in association with the rotation of the drum section 104. Further, the rolling motion mechanism 106 rolls the holding surface 110 on the lamination surface 30a rearward in the rotational direction D1. This causes the delivery point 134 located at the rear end of the sheet member W to move toward the front end of the sheet member W. The portion of the sheet member W passing through the delivery point 134 is successively delivered to the lamination surface 30a.

As in the case of the displacement of the holding surface 110 shown in FIG. 3B, the rolling of the holding surface 110 can be realized by the first cam 122 and the first cam follower 124. More specifically, the rocking shaft 116 is rotated around its own axis in a direction opposite to the rotational direction D1 in association with the displacement of the track of the first cam 122 in the radial direction D2. The rocking part 120 is rotated along with the rocking shaft 116 and changes its orientation with respect to the base plate 118. This swings the holding surface 110 rearward (i.e., the holding surface 110 decelerates in the rotational direction D1).

The holding surface 110 leaves the state of being swung forward in the rotational direction D1 and approaches the reference orientation. The holding surface 110 undergoing the reference orientation is gradually swung rearward in the rotational direction D1. As the holding surface 110 leaves the state of being swung forward and approaches the reference orientation, the displacement mechanism 108 displaces the entirety of the holding surface 110 outward in the radial direction D2. Further, the displacement mechanism 108 displaces the entirety of the holding surface 110 inward in the radial direction D2 as the holding surface 110 is swung rearward from the reference orientation.

If the holding surface 110 is rolled without providing the displacement mechanism 108, the distance of the portion of the holding surface 110 closest to the lamination surface 30a (i.e., the portion that could form the delivery point 134) to the lamination surface 30a will be largest when the holding surface 110 is at the reference position, and the distance will be smaller as the amount of swinging of the holding surface 110 (i.e., the amount of displacement around the rocking shaft 116) is increased. If the holding surface 110 in a state in which the holding surface 110 is swung forward in the rotational direction D1 to form the delivery point 134 at the rear end of the sheet member W starts to be rolled, the distance between the holding surface 110 and the lamination surface 30a at the delivery point 134 will be increased as the holding surface 110 approaches the reference orientation, making it difficult to deliver the sheet member W.

This is addressed by the displacement mechanism 108 which brings the entirety of the holding surface 110 closer to the lamination surface 30a as the holding surface 110 approaches the reference orientation and distancing the entirety of the holding surface 110 away from the lamination surface 30a as the holding surface 110 is swung rearward. This makes it possible to move the delivery point 134 parallel to the lamination surface 30a. In other words, it is possible to maintain the delivery point 134 more properly than otherwise until the delivery of the sheet member W is completed.

The displacement of the holding surface 110 is realized by the cam structure in which the second cam 130 protrudes outward in the radial direction D2. In this case, the second cam follower 132 is displaced outward in the radial direction D2 of the drum section 104 until the second cam follower 132 travels from the base end of the second cam 130 to the apex thereof. This causes the base plate 118 to slide outward in the radial direction D2, causing the entirety of the holding surface 110 to approach the lamination surface 30a. Further, the second cam follower 132 is displaced inward in the radial direction D2 of the drum section 104 until the second cam follower 132 returns from the apex of the second cam 130 to the base end thereof. This causes the base plate 118 to slide inward in the radial direction D2, causing the entirety of the holding surface 110 to be distanced from the lamination surface 30a.

Subsequently, the delivery point 134 arrives at the boundary between the first suction part 110a and the second suction part 110b, and the vacuum pump connected to the first suction nozzle 112a stops being driven to cause the first suction part 110a to cancel the suction force. In other words, the sheet member W is delivered from the holding surface 110 to the lamination surface 30a such that the second suction part 110b cancels the suction force and then the first suction part 110a cancels the suction force. This initiates the delivery of the portion of the sheet member W held by the first suction part 110a to the lamination surface 30a. It is also possible to cancel the suction force of each of the first suction part 110a and the second suction part 110b without stopping the vacuum pump. For example, the vacuum pipe may be provided with an open end that communicates with the atmosphere, and a valve for blocking the open end may be provided. According to this configuration, the suction force of each suction part can be canceled by opening the valve to cause the vacuum pipe to communicate with the atmosphere, even while the vacuum pump is being driven. By closing the valve, the suction force of each suction part is restored.

Figure 5A:
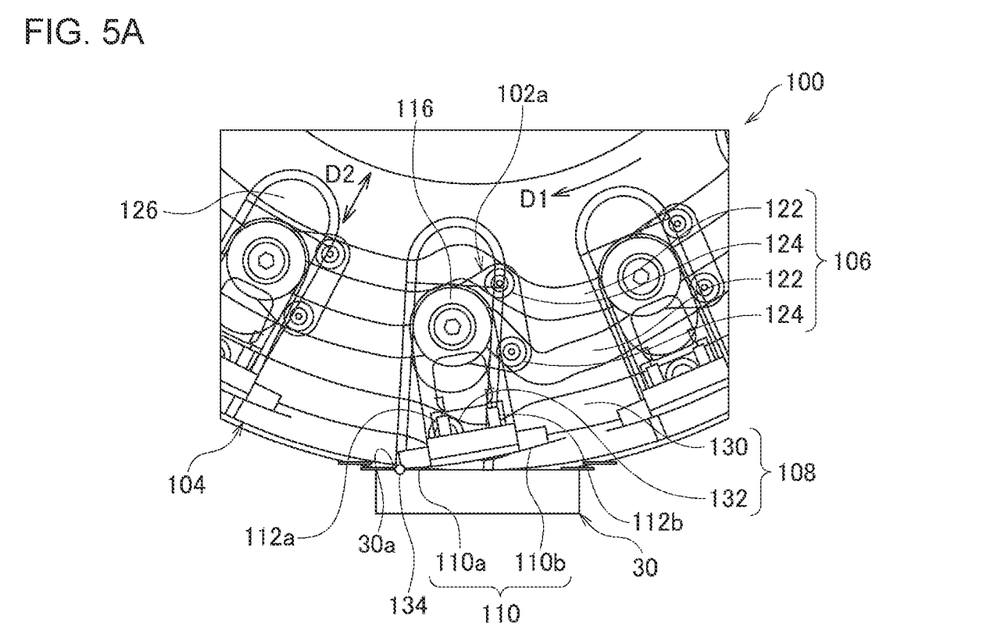
FIG. 5A and FIG. 5B are schematic diagrams for explaining the operation of the laminating device.
Figure 5B:
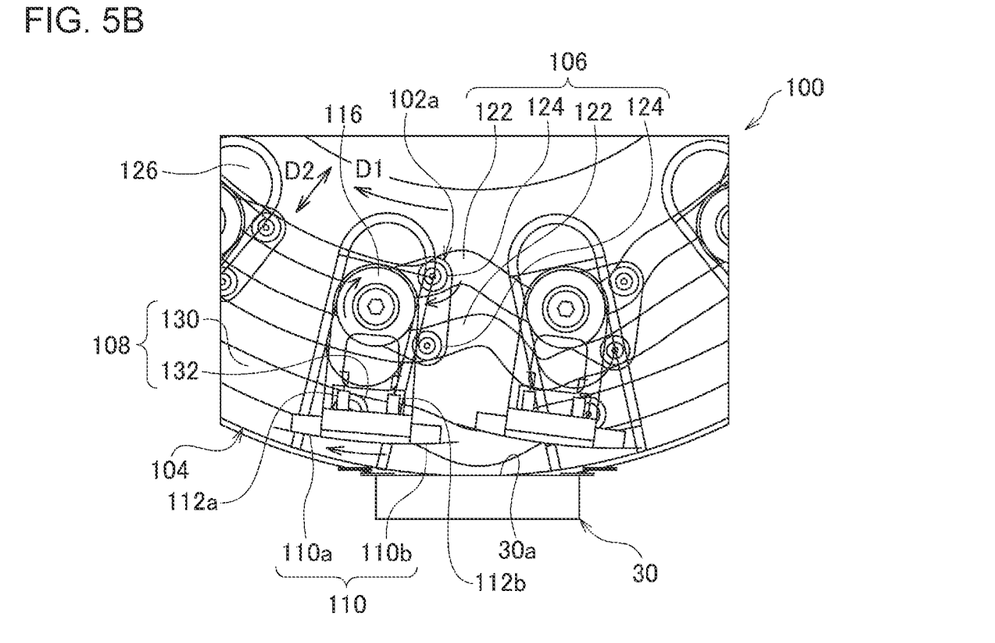

Then, as shown in FIG. 5A, as the laminating head 102a advances further and the rolling motion mechanism 106 rolls the holding surface 110 further rearward, the delivery point 134 arrives at the front end of the sheet member W. This completes the delivery of the sheet member W from the holding surface 110 to the lamination surface 30a. Subsequently, the laminating head 102a advances further and leaves the laminating position, as shown in FIG. 5B. Further, the rolling motion mechanism 106 returns the holding surface 110 in the state of being swung rearward in the rotational direction D1 to the reference position. The laminating head 102a turns around the drum section 104, receives the sheet member W from the separator cutting drum 12, and is forwarded to the laminating position again.

This displacement of the holding surface 110, like the displacement of the holding surface 110 shown in FIG. 3B and the rolling of the holding surface 110 shown in FIG. 4B, is realized by the first cam 122 and the first cam follower 124. More specifically, the rocking shaft 116 is rotated in the rotational direction D1 in association with the displacement of the track of the first cam 122 in the radial direction D2. The rocking part 120 is rotated along with the rocking shaft 116 and changes its orientation with respect to the base plate 118. This swings the holding surface 110 forward and returns it to the reference position.

The shape of the cams constituting the rolling motion mechanism 106 and the displacement mechanism 108 can be set as appropriate based on geometric calculation, simulation, etc. by the designer in accordance with the position and orientation taken by the holding surface 110. Further, the workpiece W is not limited to a component constituting a battery such as the electrode plate, the separator, and the laminated sheet. The regions of the holding surface 110 in which the suction force is adjustable in a mutually independent manner may not be limited to the two regions, namely, the first suction part 110a and the second suction part 110b. One such region may be provided, or three or more such regions may be provided. Where there are multiple regions, they are preferably arranged in the rotational direction D1.

The first cam 122 and the first cam follower 124 may be provided one each. The second cam 130 may be provided more inward in the radial direction D2 than the first cam 122. The laminating device 100 may not be provided with the displacement mechanism 108. In this case, parallel translation of the delivery point 134 can be realized by displacing the lamination stage 30.

As described above, a laminating device 100 according to the present embodiment includes: a plurality of laminating heads 102 that each has a curved holding surface 110 for holding the sheet member W; a drum section 104 in which the plurality of laminating heads 102 are arranged in a circumferential direction, the drum section 104 holding each laminating head 102 such that the holding surface 110 is swingable, and rotation of the drum section 104 causing each laminating head 102 to advance to a laminating position facing a planar lamination surface 30a provided in the lamination stage 30; and a rolling motion mechanism 106 that rolls the holding surface 110 on the lamination surface 30a so that a delivery point 134 of the sheet member W formed between the holding surface 110 and the lamination surface 30a moves from a rear end to a front end of the sheet member W in a rotational direction of the drum section 104 while each laminating head 102 is caused to move by the rotation of the drum section 104.

If the laminating head 102 is viewed as a foot of a person, the movement of the holding surface 110 brought about by the rolling motion mechanism 106 is equivalent to movement of raising the toe and landing the foot on the lamination surface 30s from the heel (this forms the delivery point 134), moving the point of contact (the delivery point 134) with the lamination surface 30a from the heel to the toe, and causing the toe to leave from the lamination surface 30a.

The laminating device 100 of the present embodiment delivers the sheet member W gradually to the lamination surface 30a, starting at the rear end in the rotation direction D1, by rolling the curved holding surface 110 on the lamination surface 30a by means of the rolling motion mechanism 106. The delivery operation can be performed without stopping the laminating head 102 at the laminating position. It is therefore not necessary to postpone the delivery operation until the vibration generated by stopping the laminating head 102 subsides. Accordingly, the throughput of the laminating device 100 is increased.

Further, the sheet member W can be laminated without generating vibration caused by stopping the laminating head 102 so that the precision of lamination of the sheet member W is increased and the quality of laminated sheet is increased. Further, the risk of applying a load such as a shear force to the sheet member W moving from a curved surface to a planar surface is reduced by rolling the holding surface 110 and delivering the sheet member W to the lamination surface 30a. Further, the the sheet member W of the present embodiment includes at least one of an electrode plate or a separator of a battery. Accordingly, the productivity and quality of laminated electrode assemblies and batteries are improved.

The rolling motion mechanism 106 of the present embodiment includes: a first cam 122 that does not follow the rotation of the drum section 104 and extends in the circumferential direction of the drum section 104; and a first cam follower 124 that is provided in each laminating head 102 and that comes into contact with the first cam 122 and moves along the first cam 122 in association with movement of each laminating head 102, wherein the first cam 122 and the first cam follower 124 roll the holding surface 110. By configuring the rolling motion mechanism 106 using a cam mechanism, the structure of the rolling motion mechanism 106 is prevented from becoming complicated and the number of components is prevented from being increased.

Further, the laminating device 100 of the present embodiment includes the displacement mechanism 108 that displaces the holding surface 110 in the radial direction D2 of the drum section 104 and moves the delivery point 134 parallel to the lamination surface 30a. By moving the delivery point 134 parallel to the lamination surface 30a, the delivery point 134 is maintained until the delivery of the sheet member W is completed. This makes it possible to deliver the sheet member W more properly than otherwise. Further, the load applied to the sheet member W being delivered from the holding surface 110 to the lamination surface 30a is further suppressed. Further, the structure required to realize parallel translation of the delivery point 134 is prevented from becoming complicated and the number of components is prevented from being increased more successfully than in the case of displacing the lamination stage 30.

Further, the displacement mechanism 108 according to the present embodiment includes: a second cam 130 that does not follow the rotation of the drum section 104 and extends in the circumferential direction of the drum section 104; and a second cam follower 132 that is provided in each laminating head 102 and that comes into contact with the second cam 130 and moves along the second cam 130 in association with movement of each laminating head 102, wherein the second cam 130 and the second cam follower 132 displace the holding surface 110. By configuring the displacement mechanism 108 using a cam mechanism, the structure of the displacement mechanism 108 is prevented from becoming complicated and the number of components is prevented from being increased.

Further, the holding surface 110 of the present embodiment includes at least a first suction part 110a and a second suction part 110b that suck the sheet member W. The first suction part 110a and the second suction part 110b are adapted to switchably generate a suction force and cancel a suction force in a mutually independent manner. Further, the first suction part 110a is provided more toward the front than the second suction part 110b in the rotational direction D1 of the drum section 104. The sheet member W is delivered from the holding surface 110 to the lamination surface 30a such that the second suction part 110b cancels a suction force and then the first suction part 110a cancels a suction force. This makes it possible to transfer the sheet member W in multiple separate stages. It is therefore possible to laminate the sheet member W on the lamination surface 30a with a higher positional accuracy.

Embodiments of the present disclosure have been described above in detail. The embodiments described above are merely specific examples of practicing the present disclosure. The details of the embodiments shall not be construed as limiting the technical scope of the present disclosure. A number of design modifications such as modification, addition, deletion, etc. of constituting elements may be made to the extent that they do not depart from the idea of the invention defined by the claims. New embodiments with design modifications will provide the combined advantages of the embodiment and the variation. Although the details subject to such design modification are emphasized in the embodiments by using phrases such as "of this embodiment" and "in this embodiment", details not referred to as such are also subject to design modification. Any combination of constituting elements included in the respective embodiments is also useful as an embodiment of the present disclosure. Hatching in the cross section in the drawings should not be construed as limiting the material of the hatched object.

The invention claimed is:

1. A laminating device adapted to laminate a plurality of sheet members on a lamination stage, comprising:
   a plurality of laminating heads that each has a curved holding surface for holding the sheet member;
   a drum section in which the plurality of laminating heads are arranged in a circumferential direction, the drum section holding each laminating head such that the curved holding surface is swingable, and rotation of the drum section causing each laminating head to advance to a laminating position facing a planar lamination surface provided in the lamination stage; and
   a rolling motion mechanism that rolls the curved holding surface on the planar lamination surface so that a delivery point of the sheet member formed between the curved holding surface and the planar lamination surface moves from a rear end to a front end of the sheet member in a rotational direction of the drum section while each laminating head is caused to move by the rotation of the drum section,
   wherein the rolling motion mechanism swings the curved holding surface of the laminating head at a position before the laminating position forward in the rotational direction and swings the curved holding surface rearward in the rotational direction in association with advancement of the laminating head by a rotation of the drum section, and wherein the laminating device comprises a displacement mechanism that displaces the curved holding surface outward in a radial direction of the drum section as the curved holding surface leaves a state of being swung forward in the rotational direction and approaches a reference orientation in which the curved holding surface is not swung forward or rearward in the rotational direction and that displaces the curved holding surface inward in the radial direction as the curved holding surface is swung rearward in the rotational direction from the reference orientation.

2. The laminating device according to claim 1,
wherein the rolling motion mechanism includes:
   a first cam that does not follow the rotation of the drum section and extends in the circumferential direction; and
   a first cam follower that is provided in each laminating head and that comes into contact with the first cam and moves along the first cam in association with movement of each laminating head, and
wherein the first cam and the first cam follower roll the curved holding surface.

3. The laminating device according to claim 1,
wherein the displacement mechanism includes:
   a second cam that does not follow the rotation of the drum section and extends in the circumferential direction; and
   a second cam follower that is provided in each laminating head and that comes into contact with the second cam and moves along the second cam in association with movement of each laminating head, and
wherein the second cam and the second cam follower displace the curved holding surface.

4. The laminating device according to claim 1, wherein
the curved holding surface includes at least a first suction part and a second suction part that suck the sheet member,
the first suction part and the second suction part are adapted to switchably generate a suction force and cancel a suction force in a mutually independent manner,
the first suction part is provided more toward the front than the second suction part in the rotational direction, and
the sheet member is delivered from the curved holding surface to the planar lamination surface such that the second suction part cancels a suction force and then the first suction part cancels a suction force.

5. The laminating device according to claim 1, wherein the sheet member includes at least one of an electrode plate or a separator of a battery.

* * * * *